United States Patent [19]

Villanyi et al.

[11] Patent Number: 5,009,435

[45] Date of Patent: Apr. 23, 1991

[54] UNITARY SEALING SYSTEM WITH INTERNAL VENTING

[75] Inventors: Tibor J. Villanyi, Hanahan, S.C.; Kevin W. Westerson, Nashville, Ind.

[73] Assignee: Cummins Engine Company, Inc., Columbus, Ind.

[21] Appl. No.: 393,881

[22] Filed: Aug. 15, 1989

[51] Int. Cl.$^5$ .............................................. F16J 15/32
[52] U.S. Cl. ........................................ 277/23; 277/47; 277/50; 277/152
[58] Field of Search ................... 277/3, 17, 24, 29, 47, 277/59, 63, 75, 79, 152, 23, 134, 50

[56] References Cited

U.S. PATENT DOCUMENTS

| | | | |
|---|---|---|---|
| 2,185,790 | 1/1940 | Kosatka et al. | 277/47 |
| 2,191,873 | 2/1940 | Victor | 277/47 |
| 2,945,709 | 7/1960 | Freed et al. | 277/79 X |
| 3,190,661 | 6/1965 | Wahl et al. | |
| 3,275,331 | 9/1966 | Mastrobattista et al. | 277/152 X |
| 3,510,177 | 5/1970 | Shimula | 277/59 X |
| 3,575,426 | 4/1971 | Durham | |
| 3,866,924 | 2/1975 | French | 277/59 |
| 3,871,666 | 3/1975 | Franz et al. | 277/59 |
| 4,153,259 | 5/1979 | Torstensson | |
| 4,353,388 | 10/1982 | Isoyama et al. | 277/59 X |
| 4,405,135 | 9/1983 | Ries | 277/152 X |
| 4,448,425 | 5/1984 | von Bergen | 277/59 X |
| 4,497,496 | 2/1985 | Repella | 277/152 X |
| 4,739,998 | 4/1988 | Steusloff et al. | 277/134 |
| 4,756,536 | 7/1988 | Belcher | |
| 4,834,397 | 5/1989 | Shimasaki et al. | 277/134 X |
| 4,943,068 | 7/1990 | Hatch et al. | 277/23 |

FOREIGN PATENT DOCUMENTS

| | | | |
|---|---|---|---|
| 469110 | 7/1937 | United Kingdom | 277/47 |
| 1389832 | 4/1975 | United Kingdom | 277/59 |
| 2173264 | 10/1986 | United Kingdom | 277/152 |

OTHER PUBLICATIONS

CR Seals Handbook, Catalog, 457010: pp. 10, 12.

Primary Examiner—William A. Cuchlinski, Jr.
Assistant Examiner—Scott Cummings
Attorney, Agent, or Firm—Sixbey, Friedman, Leedom & Ferguson

[57] ABSTRACT

A unitary seal device having a dual seal system for sealing around a rotatable shaft between the rotatable shaft and its housing to separate a region of higher pressure from a region of lower pressure is disclosed. The unitary seal device includes an annular outer housing which forms the outer periphery of the unitary seal device. The outer housing has a through bore located substantially axially centrally thereon which divides the annular outer housing into an axially inner portion and an axially outer portion. First and second seal elements having an L-shaped cross-section, including a radially extending leg and an axially extending leg are disposed in the outer housing. The axially extending legs are spaced-apart from each other to form a central channel and the radially extending legs sealingly engaging the rotatable shaft around the entire circumference of the rotatable shaft. A securing device including a first annular inner retainer located in the axial outer portion of the outer housing holds in position the radially extending legs of the first and second seal elements. A second annular inner retainer disposed in the axially inner portion of the outer housing may also be used. The outer housing through bore permits venting through said unitary seal device in the event of a sealing failure but is formed to preclude the ingress of contaminants.

17 Claims, 2 Drawing Sheets

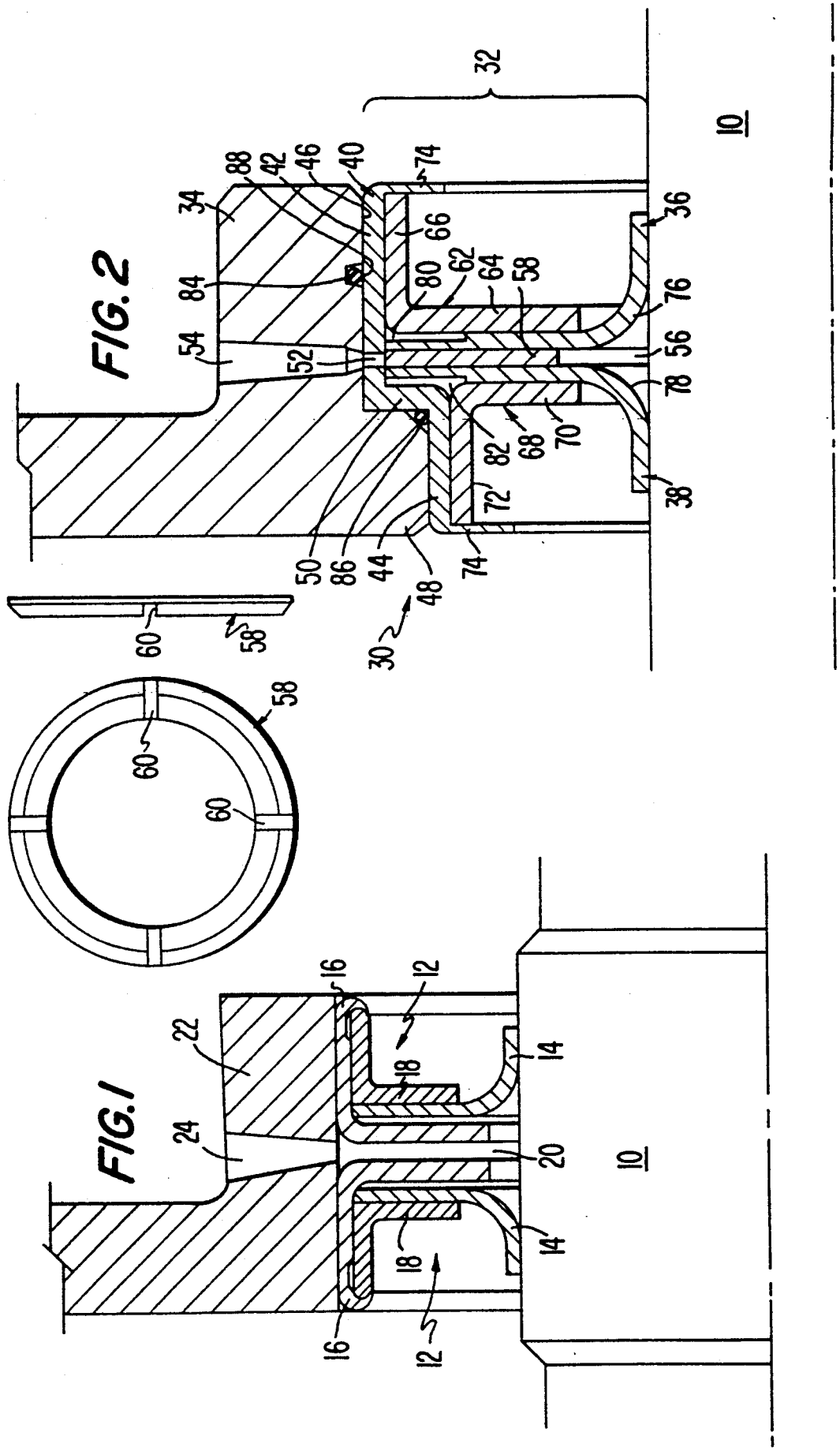

UNITARY SEALING SYSTEM WITH INTERNAL VENTING

TECHNICAL FIELD

The present invention relates to a unitary seal device for rotatable shafts which incorporates a double seal in a unitary assembly. More particularly, the present invention relates to a sealing system having a unitary seal device with two seal elements which has an internal venting capability while providing protection against seal contamination.

BACKGROUND OF THE INVENTION

Internal combustion engines require efficient and reliable seal systems to retain the various working fluids, such as fuel and oil, and other fluids such as air, in their respective chambers and compartments. One particular seal is the annular seal which fits around the rotating drive shaft of the fuel pump drive system and separates the pressurized fuel on the pump side of the shaft from the oil at slightly above atmospheric pressure existing on the drive train side of the shaft. This seal also is intended to retain oil in the engine crank case and to prevent contaminants from entering into the engine from the ambient environment.

Numerous attempts have been made to provide inexpensive and durable seals which exhibit a high degree of structural integrity and durability over long periods of time and which provide effective fuel pump drive shaft seals or seals for use in similar environments. However, historically, such drive shaft seals have been plagued by various design weaknesses.

Frequently, annular shaft seals of this type are formed with two separate and independent seal assemblies, with seals which are typically formed of rubber or a similar synthetic material, to provide additional sealing protection in the event of a failure of one of the assemblies. As a further measure of protection, these seal assemblies may be spaced to form a vent or channel which provides fluid communication from the area between the two seal elements to an external area such as one exposed to atmospheric conditions. U.S. Pat. Nos. 3,190,661 to Wahl et al, 3,575,426 to Durham, 4,153,259 to Torstensson and 4,756,536 to Belcher all disclose such dual sealing assemblies formed to provide a vent or channel between sealing elements.

It is both difficult and time consuming to individually mount and position two separate seal assemblies on a shaft and to then effectively seal each of the individual assemblies against leakage. Also, the open vent or channel between the seals provides an access for seal damaging contaminants which are present in an engine environment. However, for many seal applications, the vent or channel is a necessary component.

Seal assemblies used for fuel pump drive shafts are subjected to high pressure fuel on one side and a low pressure area on the opposite side, and significant variations in the fuel pressure make it difficult to maintain an effective seal. Fuel side pressure spikes often result in seal assembly outer diameter sealant leaks, and excessive pressure spikes can cause seal assembly blowout where the seal assembly is actually dislodged from a seal retaining bore. If blowout is prevented by positively retaining the seal assembly in the bore, such excessive fuel side pressure spikes will destroy the seal assembly.

SUMMARY OF THE INVENTION

It is a primary object of the present invention to provide a novel and improved unitary sealing system for creating and maintaining an effective shaft seal between a low pressure region and a region of variable high pressure. The system includes a unitary shaft seal which is positively retained within a seal receiving bore to prevent seal blowout in response to excessive pressure variations and to respond to seal leakage by venting fluid from the sealing system.

Yet another object of the present invention is to provide a novel and improved unitary sealing system which includes a unitary seal with spaced-apart seal elements within a single housing. A venting assembly is provided between the seal elements which operates both as a seal element support and to prevent contaminants from entering the sealing system through the venting assembly. The venting assembly further operates to permit fluid leaks caused by seal failure to vent from the sealing system.

A further object of the present invention is to provide a novel and improved unitary sealing system which includes a unitary seal including two spaced-apart seal elements within a single housing. The housing is provided with a vent opening between the seal elements, and a venting assembly between the seal elements operates as a center support for the seal elements while preventing contaminants from reaching the seal elements through the vent opening. Inner seal retainers cooperate with the venting assembly to retain the seal elements in place, and are formed of the same material as the housing to prevent leakage due to differential heat expansion.

Another object of the present invention is to provide a novel and improved unitary sealing system which includes a unitary seal positively retained within a seal receiving bore and sealed to the bore by external O-ring seals. The bore includes a vent opening which aligns with either a housing vent opening or a vent channel in a housing for the unitary seal. The unitary seal includes spaced-apart seal elements mounted on either side of the housing vent opening by a central venting assembly which prevents contaminants from reaching the seal elements through the housing vent opening while permitting fluid leaks caused by seal failure or excessive fluid pressure to vent through the housing vent opening.

A still further object of the present invention is to provide a novel and improved unitary sealing system which includes a unitary seal including two spaced-apart seal elements within a single housing. Each seal element is designed and mounted to provide a lay down sealing lip, and the sealing surface of each sealing element is hydrogrooved to provide a pumping action. The single housing includes a vent opening positioned between the seal elements, and a venting assembly between the seal elements supports the seal elements while preventing contaminants from reaching the seal elements through the vent opening. The venting assembly includes a filter mounted beneath the vent opening and operates to vent fluid due to seal failure.

These and other objects are attained by providing a unitary sealing system including a support element having a stepped bore with a weep hole extending from the bore externally of the system. A unitary seal having a single outer housing which is shaped to engage the stepped bore and to be positively retained thereby has a housing vent which aligns with the weep hole in the bore when the outer housing is in place within the bore. Since the outer housing is positively retained by the bore, it may be sealed by O-rings extending around the outer housing and between the outer housing and the bore on either side of the weep hole.

A pair of sealing elements are mounted within the outer housing and are supported and spaced on either side of the housing vent by a central venting assembly which engages the sealing elements. The sealing elements are retained against the central venting assembly by one or more retainers formed of the same material as the outer housing. In some embodiments, one retainer and the outer housing operate to retain the sealing elements, which are in turn sealed to the retainers and housing by sealing gaskets.

The central venting assembly includes a washer-like element which contains grooves or openings to permit fluid to vent to the housing vent while preventing contaminants from reaching the sealing elements. The washer-like element may be designed to support a filter in line with the housing vent.

BRIEF DESCRIPTION OF THE DRAWINGS

FIG. 1 is a cross-sectional view of a known sealing system for a shaft using two separate seals.

FIG. 2 is a cross-sectional view of the unitary sealing system of the present invention mounted on a shaft;

FIG. 3a is a top view of the channel washer and FIG. 3b is a side view of the channel washer of FIG. 2;

DETAILED DESCRIPTION OF THE PREFERRED EMBODIMENTS

Figure 5:
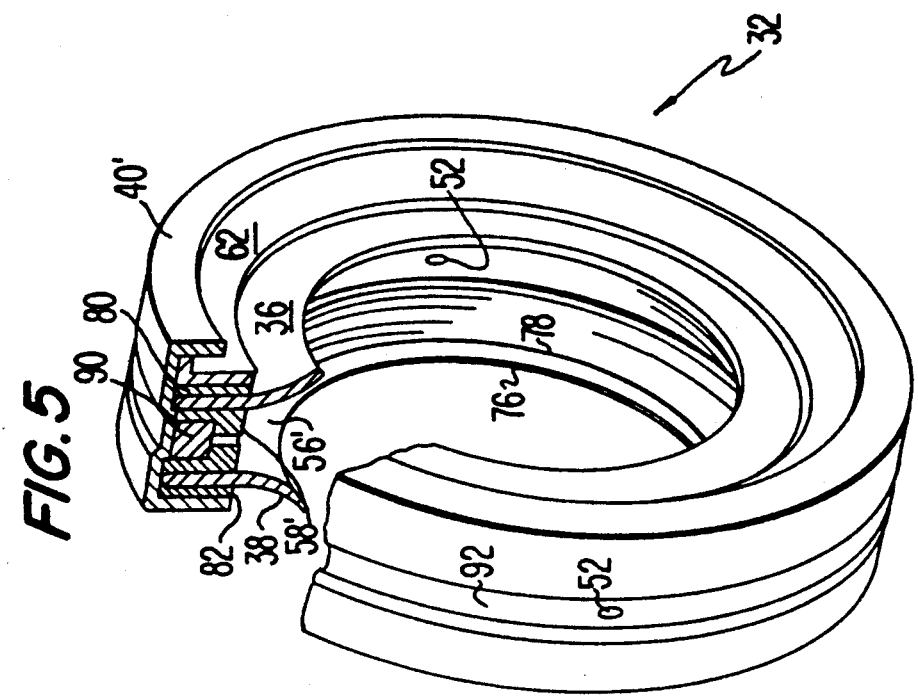
FIG. 5 is a perspective partially sectional view of the unitary sealing system of FIG. 4.

The sealing system of the present invention is used to seal a rotatable shaft to provide a fluid seal between relatively movable components, and to separate adjacent areas of different pressures. Specifically, the sealing system of the present invention is particularly adapted to seal a fuel pump drive shaft within a housing through bore to thereby create a seal between a region containing fuel at a relatively high pressure and a region containing oil at a relatively low pressure slightly above atmospheric pressure. The sealing system also prevents contaminants from entering into the seal area from the ambient environment while permitting drainage of leaks.

Referring first to FIG. 1, a prior art two-piece sealing system for a fuel pump is shown. In FIG. 1, a seal is provided around a drive shaft 10, and the seal is effected by two separate seal assemblies 12. Each of the seal assemblies includes a rubber or synthetic seal element 14 which may be held around the drive shaft 10 by means of a radial casing 16, usually made of steel. The seal is held in the casing by a retainer 18. Less advanced designs require a radial lip spring to secure the seal element around the drive shaft as shown in the Durham patent previously referenced. One radial casing 16, lip spring (where used), retainer 18 and seal element 14, are required to form a separate seal assembly 12, and two separate and individual seal assemblies are mounted around the drive shaft 10 and are spaced apart by a bleed out cavity 20. Therefore, this system requires the installation of two assemblies.

A front cover 22 is secured to one end of the fuel pump and has a cylindrical bore for receiving the shaft 10 and the two seal assemblies. The front cover 22 also is formed with a weep hole 24 which provides communication from the space between the two seal assemblies to the ambient atmosphere. The two separate seal assemblies must be separately installed, and in sealing systems of this type, in order to properly seal and prevent leakage between each seal assembly 12 and the bore wall of the front cover 22, a bore sealant must be applied to the contacting surfaces of the seal assemblies.

The sealing system 30 according to the present invention, as shown in FIG. 2, includes a seal assembly 32 combined with a front cover 34 for a fuel pump. The seal assembly 32 is a unitary seal assembly which is disposed around drive shaft 10 as an integral unit, and includes two seal elements; namely, an inner seal element 36 and an outer seal element 38. Both seal elements are housed within a single annular housing 40 which forms the entire outer housing of the seal assembly 32, and only one seal assembly 32 need be installed around the fuel pump drive shaft 10. This reduces the tooling and installation costs by half as compared with prior systems which require two separate seal assemblies.

The outer housing 40 is formed with a stepped outside diameter such that an axially inner portion 42 facing the fuel side of the sealing assembly has a greater diameter than an axially outer portion 44 facing the oil side of the sealing assembly. This shape of the outer housing 40 conforms to the stepped shape of a bore 46 formed through the front cover 34. The bore 46, is formed with an inwardly projecting section 48 on the outer side of the front cover 34 corresponding to the outer diameter of the axially outer portion 44 of the housing 40 for the seal assembly 32. Outer housing 40 includes a radial portion 50 which abuts against the inside edge of projecting section 48, and this orientation prevents the seal assembly 32 from being able to move outwardly relative to the front cover 34. Thus, in the event of pressure spikes or other pressure surges from the inner or fuel side of the sealing system, the seal assembly 32 cannot be blown outwardly of its position along the drive shaft, as the projecting section 48 serves as a positive stop to prevent the seal assembly 32 from being blown out.

The outer housing 40 is formed with a through bore 52 which aligns with a weep hole 54 in the front cover 32. Fluid communication is provided from a central channel 56 between the two seal elements 36, 38 to the ambient atmosphere through weep hole 54 and bore 52. Thus, in the event of a seal element failure, such as failure of the seal 36, fuel leaks from the fuel side of the sealing system (the right side as viewed in the figures) into central channel 56, and through outer case through bore 52 and weep hole 54 to the outer side of front cover 34. Fuel leaks or drips out of the fuel pump assembly, rather than to the oil side of the seal assembly (the left side as viewed in the figures), to indicate failure of the seal.

A channel washer 58, which preferably is formed of nylon, is disposed within central channel 56 and engages and spaces inner seal element 36 from outer seal element 38 within the seal assembly 32. The channel washer 58 is formed with a plurality of radial grooves 60, as shown in FIG. 3, which permit any leaked fuel to pass therethrough during travel through the central channel 56. However, the grooves 60 are narrow enough to preclude contaminants from passing therethrough into the area containing the sealing elements.

A fuel side annular inner retainer 62 having an L-shaped cross-section is disposed with a leg 64 abutting inner seal element 36 and the remaining leg 66 abutting the inner surface of outer housing 40. A second annular inner retainer 68 disposed on the oil side of the sealing assembly, has an L-shaped cross-section with a leg 70 abutting outer seal element 38 and a remaining leg 72 abutting the inner surface of outer housing 40. The legs 64, 70 of inner retainer 62, 68 and the channel washer 58 combine to secure the inner and outer seal elements 36, 38, respectively, in position and the inner retainers are, in turn, secured by the engagement of legs 66, 72 with outer housing 40. Radially inwardly extending lips 74 formed on outer housing 40 at the outer ends of the inner and outer portions 42 and 44 are formed to further secure together and unitize the seal assembly 32. Both inner retainers 62, 68 and outer housing 40 are formed of identical material, preferably aluminum. This means that the inner retainers and the outer housing have the same coefficient of heat expansion and therefore expand at the same rate. Thus, there are no leaks between the inner retainers and outer housing caused by unequal and uneven expansion.

The seal elements 36, 38, when in place, are also L-shaped in cross section and, as discussed above, are held between respective legs 64, 70 of inner retainers 62, 68 and the channel washer 58. The seal elements 36, 38 are preferably formed of polytetrafluoroethylene such as TEFLON ® having excellent wear characteristics that are superior to those of synthetic rubber which is commonly used with prior art sealing systems. The seal elements form what is known in the art as a "lay down lip" design in which a portion of each seal element, or lip, lays across the surface of the drive shaft 10. This configuration maintains adequate pressure between the seal elements and the drive shaft without the need for additional biasing devices such as radial springs which are commonly used with prior art seal assemblies. The seal elements also are hydrogrooved; that is, grooves 76, 78, are formed circumferentially around the shaft contacting surface of each seal element. The hydrogrooves 76, 78 are circular and perform dual functions. First, the hydrogrooves provide relief during the formation and manufacturing of the seal elements to facilitate bending back the seal elements from a straight position to their 90° bent L-shaped configuration. Second, when the seal elements 36, 38 and the seal assembly 32 are installed around the drive shaft 10, the hydrogrooves 76, 78 provide a pumping action which assists in maintaining a proper pressurized seal. The hydrogrooves 76, 78 being best illustrated in FIGS. 5 and 6.

A gasket 80, 82 is provided between each respective seal element 36, 38, its respective inner retainer 62, 68 and the adjacent portion of outer housing 40 to further hold the seal elements in position and maintain a proper seal.

The seal assembly 32 is installed around the drive shaft 10 by first placing the seal assembly in the bore 46 of the front cover 34 and then by positioning the front cover on the end of the fuel pump assembly (not shown) so that the seal assembly surrounds the fuel pump drive shaft. To seal between the front cover 34 and the seal assembly 32, two O-rings 84, 86 are placed around the outer periphery of the outer housing 40. One O-ring 84 is disposed around the outer housing 40 at its larger diameter portion 42 and is seated within an annular groove 88 formed in the wall of bore 46. The other O-ring 86 is disposed around the outer housing 40 at its smaller diameter outer portion 44 and is seated in the corner formed between the outer portion 44 and the radial portion 50. This O-ring 86 is accommodated by a beveled portion of the projecting section 48 of front cover 34 as shown in FIG. 2. The O-rings prevent leakage between the bore 46 of front cover 32 and outer housing 40, and are superior in performance to, and obviate the need for, bore sealant coatings. Two O-rings are necessary so both the fuel side and oil side are isolated from the central weep hole. The use of the O-ring seals is made possible by the stepped bore 46 which positively retains the seal assembly 32 and precludes blowout.

Figure 6:
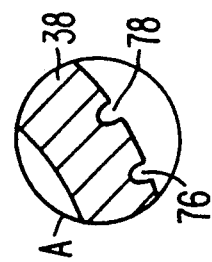
FIG. 6 is an exploded view of that portion A of FIG. 4.
Figure 4:
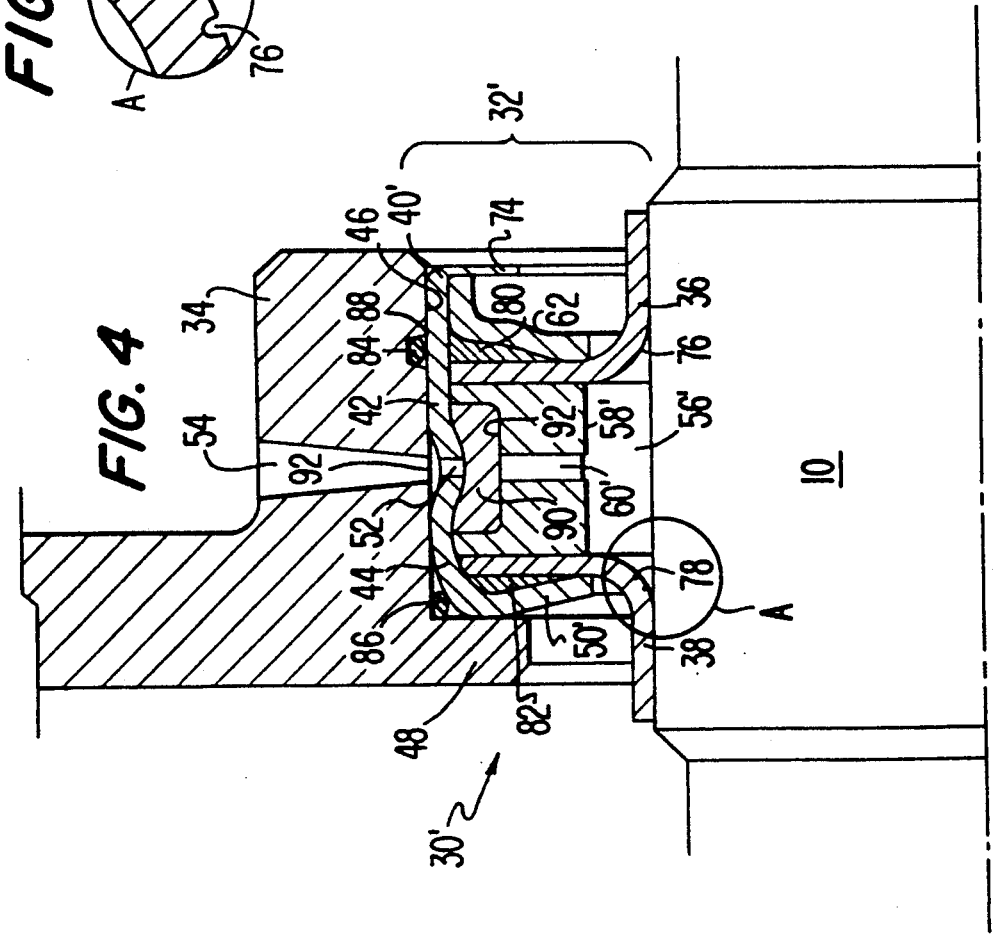
FIG. 4 is a cross-sectional view of a second embodiment of the unitary sealing system of the present invention mounted on a shaft.

A modified version of the sealing system incorporating a unitary seal assembly 32 is shown in FIGS. 4 and 5. In this embodiment, like elements retain their original reference numerals and will not be redescribed, while modified elements are indicated by prime numerals. In the embodiment of FIGS. 4 and 5, the front cover 34 of the fuel pump is essentially identical to that of FIG. 2, although its interface with seal assembly 32' is modified as shown. Outer housing 40' is formed without a smaller diameter outer portion 44 and radial portion 50' abuts the projecting section 48 and extends around outer seal element 38 to retain the outer seal element in position. No fuel side inner retainer 68 is used in this embodiment. Due to these modifications, O-ring 86 is located at the junction of radial portion 50' and the outer circumferential surface of the outer housing 40, and is disposed in the corner formed by the projecting section 48 and the inner circumferential wall of bore 46 of the front cover 34. These modifications are made to simplify the fabrication process and to reduce the cost of fabrication.

Also in this embodiment, the axial width of central channel 56' is greater than that of central channel 56 and channel washer 58' therefore has a modified shape. The channel washer 58' does not include the radial grooves 60, but instead has a central opening (or openings) 60' which is oriented coaxially with the central channel.

An additional element shown in FIGS. 4 and 5 is a filter 90 preferably made of foam. Filter 90 resides within a complementarily shaped cavity 92 in channel washer 58' and serves to prevent contamination of the seal elements 36, 38 caused by external contaminants entering the seal assembly 32' through the front cover weep hole 54, while permitting the flow of leaked fuel therethrough. Although not shown in FIG. 2, filter 90 may also be used with the embodiment shown therein.

It should be noted that the filter 90 is an annular filter which is positioned beneath a channel 92 that extends around the exterior of the housing 40'. A plurality of through bores 52 are located in the channel 92 which is in turn positioned beneath the weep hole 54. There is no need to align a through bore 52 with the weep hole, since fluid will flow around the channel 92 to the weep hole. The O-rings 86 and 88 on either side of the channel effectively seal the channel so that fluid therefrom must exit through the weep hole. Also, the fact that the through bores are not aligned with the weep hole provides enhanced protection against contaminants from the weep hole reaching the seals.

Numerous characteristics, advantages, and embodiments of the invention have been described in detail in the foregoing description with reference to the accompanying drawings. However, the disclosure is illustrative only and the invention is not limited to the precise illustrated embodiments. Various changes and modifications may be effected therein by one skilled in the art without departing from the scope or spirit of the invention.

INDUSTRIAL APPLICABILITY

The present invention finds applicability in a wide range of rotatable drive shaft environments, particularly for automotive use. The present invention is especially useful with fuel pump systems and the drive shafts associated with the fuel pumps such as those used with compression ignition internal combustion engines.

We claim:

1. A unitary seal device having a dual seal system for sealing around a rotatable shaft between the rotatable shaft and its cover to separate a region of higher pressure along the shaft on one side of the cover from a region of lower pressure along the shaft on the other side of the cover, said sealing system comprising:
    an annular outer housing which forms an outer periphery of said unitary seal device, said annular outer housing having a radial through bore formed therein which divides said annular outer housing into an axially inner portion and an axially outer portion, said through bore operating to permit venting through said unitary seal device in the event of a sealing failure;
    first and second seal elements each including a radially extending portion and an axially extending portion, each of said radially extending portions being spaced apart from the other to form a central channel and each of said axially extending portions including a shaft engaging surface adapted to sealingly engage the rotatable shaft around to entire circumference of the rotatable shaft;
    filter means disposed in said central channel adjacent said through bore for preventing external contamination of said first and second seal elements; and
    securing means for securing said first and second seal elements in position within said annular outer housing.

2. The unitary seal device according to claim 1, further comprising pumping means for providing a pumping action to enhance the seal around the rotatable shaft, said pumping means comprising at least one circumferentially extending hydrogroove formed on said shaft-engaging surface of each axially extending portion.

3. The unitary seal device according to claim 1 wherein said securing means comprises a first annular inner retainer located in said axially inner portion of said outer housing which engages and holds in position said radially extending portion of said first seal element.

4. The unitary seal device according to claim 3 wherein said securing means further comprises a second annular inner retainer located in said axially outer portion of said outer housing.

5. The unitary seal device according to claim 4 wherein said first and second annular inner retainers each comprise a retaining wall portion for securing said respective first and second seal elements in position.

6. The unitary seal device according to claim 5 further comprising a first gasket disposed between said first seal element and said first retaining wall, and a second gasket disposed between said second seal element and said second retaining wall.

7. The unitary seal device according to claim 1 further comprising a washer disposed in said central channel adjacent said outer housing through bore, said washer having a recess for receiving said filter and a washer bore substantially aligned with said outer housing through bore to permit fluid flow therethrough.

8. The unitary seal device according to claim 1 wherein said first and second seal elements are formed of polytetrafluoroethylene.

9. The unitary seal device according to claim 1 wherein said first and second seal elements form lay down lip seals against the rotatable shaft.

10. The unitary seal device according to claim 1 wherein said first and second seal elements curve outwardly from a central radial axis of said outer housing.

11. The unitary seal device according to claim 1 wherein said outer housing is formed with a stepped outer diameter to fit and function properly within a front cover having a correspondingly shaped bore.

12. A sealing system for sealing around a rotatable shaft to separate a region of higher pressure along the shaft from a region of lower pressure along the shaft, said sealing system comprising:
    a unitary seal device having a dual seal system, said unitary seal device comprising: a unitary, annular outer housing which forms an outer periphery of said unitary seal device, said annular outer housing having at least one radial through bore formed therein, said through bore dividing said annular outer housing into an axially inner portion and an axially outer portion, wherein said through bore permits venting through said unitary seal device in the event of a sealing failure; generally L-shaped first and second seal elements each including a radially extending portion and an axially extending portion, said radially extending portions being spaced apart from each other to form a central channel beneath said through bore and said axially extending portions being adapted to sealingly engage the rotatable shaft around the entire circumference of the rotatable shaft; and securing means for securing both said first and second seal elements in position within said unitary seal device, said securing means including an annular washer means mounted in said central channel to engage and support said seal elements, said washer means including a through channel to permit the passage of fluid to said through bore, and an annular filter means mounted in said central channel between said washer means and said through bore; and
    a cover having a central bore for receiving said unitary seal device and the rotatable shaft.

13. The sealing system according to claim 12, wherein said outer housing is formed with a stepped outer diameter, said axially outer portion having a smaller diameter than said axially inner portion to form a radial portion connecting said axially inner portion to said axially outer portion, and wherein said cover includes a projecting portion which complementarily engages said smaller diameter axially outer portion on the low pressure side of said unitary seal device to form a positive stop to restrict said unitary seal device from axial movement along the rotatable shaft to prevent a blowout of said unitary seal device.

14. The sealing system according to claim 13, further comprising spaced O-rings disposed around said outer housing to seal between said outer housing and the central bore of said cover, said O-rings being spaced on opposite sides of said through bore and weep hole.

15. The sealing system according to claim 12, wherein an annular external channel is formed in said annular outer housing in substantial alignment with said central channel, said through bore being formed in said annular external channel, said cover having a weep hole formed therein which is aligned with said annular external channel when said unitary seal device is received within the central bore of said housing means.

16. The sealing system according to claim 15, wherein said through bore is not aligned with said weep hole when said unitary seal device is received within said central bore.

17. The sealing system according to claim 15, wherein a plurality of through bores are formed in said outer housing in said annular external channel.

* * * * *